3,808,304
ORIENTED BLENDS OF POLYPROPYLENE
AND POLYBUTENE-1
Henry G. Schirmer, Spartanburg, S.C., assignor to W. R.
Grace & Co., Duncan, S.C.
Continuation of abandoned application Ser. No. 355,522,
Mar. 18, 1964. This application Sept. 23, 1968, Ser.
No. 768,955
Int. Cl. C08f 29/12
U.S. Cl. 264—289                              8 Claims

ABSTRACT OF THE DISCLOSURE

This invention is directed to orienting and heat sealing and heat shrinking blends of isotactic polypropylene and polybutene-1.

---

Figure 1:
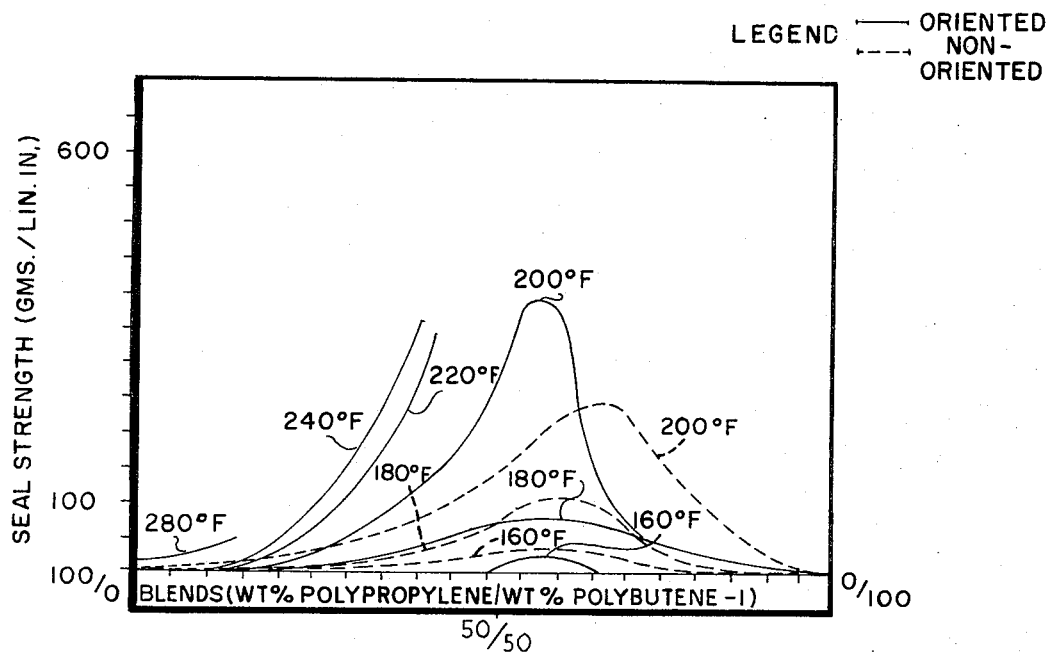

This application is a continuation of application Ser. No. 355,522, filed Mar. 18, 1964, now abandoned.

This invention relates to oriented blends of polypropylene and polybutene-1. In one aspect the invention relates to a method for improving the heat sealability of polypropylene. In another aspect the invention relates to a method for improving the heat shrinkability of oriented polypropylene.

Polypropylene and polybutene-1 are known thermoplastic mono-1-olefin polymers. More recently, new copolymers of alphaolefins (of the formula $CH_2=CHR$ where R is a hydrocarbon radical) have been discovered which are linear, regular head-to-tail, have substantially no branches longer than R, and comprise macromolecules having a regular steric structure which has been referred to as an "isotactic structure." The isotactic structure is the structure of the portions of the macromolecules in which, if the macromolecule is arbitrarily assumed to be fully extended in a plane, the R substituents on the tertiary carbon atoms are all on one side (e.g. above) and the H atoms on those carbon atoms are all on the other side (e.g. below) of the plane of the chain. (In a successive isotactic portion of the same chain the position of the R and H substituents may be reversed with respect to the position they had in the previous position.) The isotactic macromolecules are defined herein as those macromolecules which are non-extractable with boiling n-heptane for polypropylene and diethylether for polybutene-1, are highly crystallizable, and are crystalline under appropriate conditions. For purpose of this discussion the isotactic content is determined by placing 2.5 to 0.1 gram of polymer in a weighed extraction thimble and extracting in an ASTM Rubber Extraction Apparatus for 2.5 hours with 100 ml. of boiling normal heptane (for polypropylene or diethylether for polybutene-1) at one atmospheric pressure. The thimble is then removed and dried in a forced oven at 110° C. for 2 hours after which it is cooled in a desiccator and weighed. The weight percent of residue, based on original polymer, is calculated and recorded as isotactic content. As employed herein, atactic content refers to the extractable portion of the polymer and the term crystalline is essentially synonymous with isotactic and amorphous refers to atactic polymer.

Isotactic polypropylene has a high ultimate strength, a high elastic modulus and retains useful mechanical properties at higher temperatures than most thermoplastic resinous materials. It tends to be, however, brittle at about 20° C. and is difficult to process. Further, its use in applications where resistance at low temperatures is required tends to be limited. In addition it will not heat seal to itself at temperatures less than its melting point (about 340° F.) which requires sealing temperatures so high as to restrict its use for oriented film.

Isotactic polybutene-1 has a high tensile strength and a relatively low brittle point (about 4° F.) but has a low elastic modulus which is a limit in applications requiring flexural rigidity.

It is an object of the invention to provide a novel blend of polypropylene and polybutene-1.

Another object of the invention is to provide a method of improving the seal strength of polypropylene.

Yet another object is to improve the seal strength of a blend of polypropylene and polybutene-1.

Still another object is to provide a heat shrinkable polypropylene.

Another object is to provide a heat shrinkable blend of polypropylene and polybutene-1.

Still another object is to provide a method of heat shrinking oriented polypropylene.

Another object is to provide a method of heat shrinking an oriented blend of polypropylene and polybutene-1.

These and other objects of the invention will be readily apparent to those skilled in the art from the following disclosure and appended claims.

These objects are broadly accomplished by preparing a blend of polypropylene and polybutene-1 and heat sealing said blend at a temperature less than the melting point of either polymer. In one embodiment of the invention, the blend of polymers is oriented by cold working and heat shrunk at low temperatures.

Although blends of polypropylene and polybutene-1 are known, it is most surprising to discover that these blends, particularly blends containing about 30–50 weight percent polypropylene, have unusual and useful properties. Most advantageous to the film users is the discovery that these blends may be heat sealed at a temperature lower than the crystalline melt point of either polymer. High seal strengths are obtained at much lower temperatures than one would expect from the known properties of either polymer. Further, the polymer blend may be oriented or non-oriented. The oriented polymer blend has the additional advantage of being heat shrinkable at much lower temperatures than one would expect from the known properties of either polymer.

The blend will have variable properties depending on the ratio of polypropylene to polybutene-1. Desirable properties are obtained when the blend contains 30–90, more preferably 30–50, weight parts of polypropylene and 70–10, more preferably 70–50, weight parts of polybutene-1, based on total blend weight.

The orientation of thermoplastic polymers, such as polyethylene, polypropylene, polybutene-1 and copolymers of vinylidene chloride, by cold working is well known. The invention is not limited to any particular method of orientation and any suitable means, such as stretched either unilaterally or bilaterally, may be employed. For simplification, orientation is described herein with reference to biaxial orientation (actually omniaxial) wherein molten polymer (including a blend) is extruded through an annular die to form a tube which is solidified. The tube, or tape, is then inflated by internal air pressure at a temperature less than its crystalline melting point thereby biaxially orienting the molecules. The resultant bubble is then deflated to form a flattened tube of tape which may be slit to form a film.

The racking temperatures and internal air pressures are fairly critical for each type of polymer. If the temperature is too high or too low the bubble will break thus stopping production until a new bubble can be formed. These conditions have been found to be especially critical for polypropylene or polybutene-1, particularly isotactic polypropylene or isotactic polybutene-1. However, it has now been found that the addition of polybutene-1 to polypropylene, or vice versa, greatly expands the permissible temperature limits for racking of either of these polymers.

Further the required temperatue is lowered as the concentration of polybutene-1 increases. Strangely, at a constant work load (constant expansion volume) the permissible racking temperature is reduced about 9–10° F. for every 10% polybutene-1 added to polypropylene until about 60% has been added where the temperature drop suddently increases to about 17° F. (less amounts for less work) for each 10%. This abrupt drop in racking temperature in the area of 60% polybutene-1 indicates a decided change in the orientation mechanism, although the exact mechanism can only be guessed. In addition, an important advantage of the blend is the clarity of the racked film.

It has also been found that a blend of polypropylene and polybutene-1 is heat sealable at a temperature less than the melting point of either polymer by itself. Sealing at a temperature in excess of the melting point, under pressure, produces almost complete fusion, but results in loss in strength of the surrounding film area due to the change from crystalline to amorphous structure. However, polypropylene has been found to be only slightly sealable at temperatures below its melt point and, although polybutene-1 melts at a lower temperature, about 251° F., it lacks the strength of polypropylene. It was therefore most surprising to discover that polypropylene polybutene-1 blends could be heat sealed at temperatures less than 220° F.—even as low as 160° F. Neither polymer by itself can be heat sealed at these temperatures. The strength of the seal depends on the temperature employed and the blend ratio as depicted in FIG. 1. The strength of the seal increases with the increase in polybutene-1 concentration up to about 60% polybutene-1. At concentrations greater than 60% polybutene-1, the seal strength diminishes. Seal strengths were not measured above the melting point of the respective blends. Seal strengths for both the oriented and non-oriented blends are shown. These are further described in Example II. Preferably the sealing temperature is less than 290° F., more preferably 160 to 250° F., even more preferably 160 to 210° F. The seals of oriented polymer thus produced have less deformation due to shrink than seals produced at higher temperatures.

An inherent disadvantage of oriented polypropylene is the high temperature required to shrink the film. Surprisingly, the addition of polybutene-1 lowers the shrink temperature so that substantial shrink energies may be obtained at temperatures of 212° F. or even less. This makes it possible to use boiling water to shrink the film instead of some fluid at much elevated temperatures to achieve shrinkage. Again, peculiar properties of blends of about 30–50% polypropylene are observed. The amount of shrinkage at a particular temperature increases as the concentration of polybutene-1 increases with a significant increase at about 40% polypropylene. As the concentration of polybutene-1 further increases there is a sharp decrease in shrinkage until the concentration reaches about 80% polybutene-1 when the amount of shrinkage levels out or increases with the increase of polybutene-1 concentration. At temperatures less than about 240° F. the amount of shrinkage for the 40/60 polypropyene/polybutene-1 blend is actually greater than for either of the polymers by themselves. The temperature employed depends on the polymer blend but is preferably 160 to 290° F., more preferably 190 to 230° F., even more preferably about the boiling point of water.

The polymers employed to prepare the oriented homogeneous blend of the invention are polypropylene and polybutene-1, more preferably an isotactic polypropylene and an isotactic polybutene-1. Preferably, the isotactic content of both the polybutene-1 and the polypropylene is at least 93%, preferably about 97 to 100%, as measured by the polymer's insolubility in boiling n-heptane for polypropylene or boiling diethylether for polybutene-1 as hereinbefore described.

The polymers may be admixed by any suitable means to form a homogeneous blend, such as dry mixing, solution mixing, or mixing the two polymers together while in a molten state or combinations thereof.

Additives, such as fillers, antioxidants, pigments, antistatic agents, slip agents, antitack agents and the like may be incorporated in the polymers, either before, after or during the blending operation.

No irradiation or crosslinkage of the films is required.

The invention is best described by the following examples.

EXAMPLE I

Biaxial orientation of blends of polypropylene and polybutene-1

A series of 15 mil tapes were chill cast from homogeneous mixtures of isotactic polypropylene (6420, Hercules Powder Co., 98.2% insoluble in boiling n-heptane) and isotactic polybutene-1 (Petro-Tex AS8–121, 97.2% insoluble in boiling diethylether. The barrel temperature of the extruder was 375° F. and the die temperature was 420° F. The chill roll temperature was 225° F. except that the roll temperatures was lowered to 160° F., 140° F., 130° F., and 125° F. for the 70, 80, 90, and 100% polybutene-1 runs, respectively. Starting with 100% by weight polypropylene, mixtures were cast with the amount of polybutene-1 increasing at 10% intervals until 100% polybutene-1 was reached.

The tapes of the polymer blends were then biaxially oriented by blowing a "hat." This was accomplished by placing a platen of the tape over a conduit in communication with air under 7 p.s.i. pressure. The edges of the platen were held in place and the entire platen heated to a specified temperature. When the platen reached this temperature, as determined by thermocouples, a valve was automatically opened to permit the air pressure to blow a bubble or "hat" in the platen. This is considered to be generally equivalent to "racking" wherein a tape is biaxially oriented by inflating the tape between 2 sets of rolls to form a trapped bubble as known to those skilled in the art. If the "hat" fails at the employed air pressure, the temperature employed is either too high or too low. The range of racking temperatures for each blend was determined by racking each tape at 7 p.s.i. air pressure, starting at 290° F. and progressively lowering the temperature at 10° F. increments until the tape no longer racked into film. A plot showing the maximum racking temperatures vs. the blend ratios is shown in FIG. 2.

Figure 2:
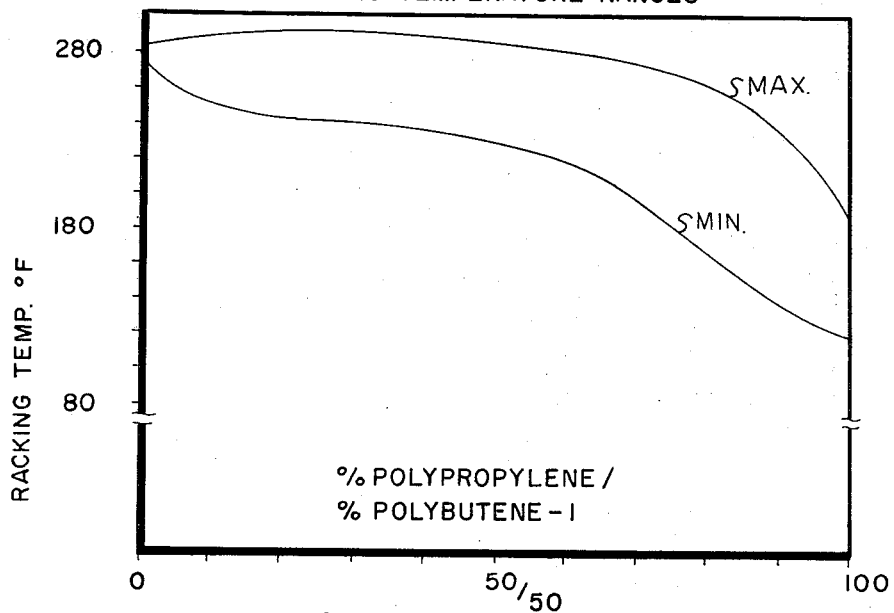
Figure 4:
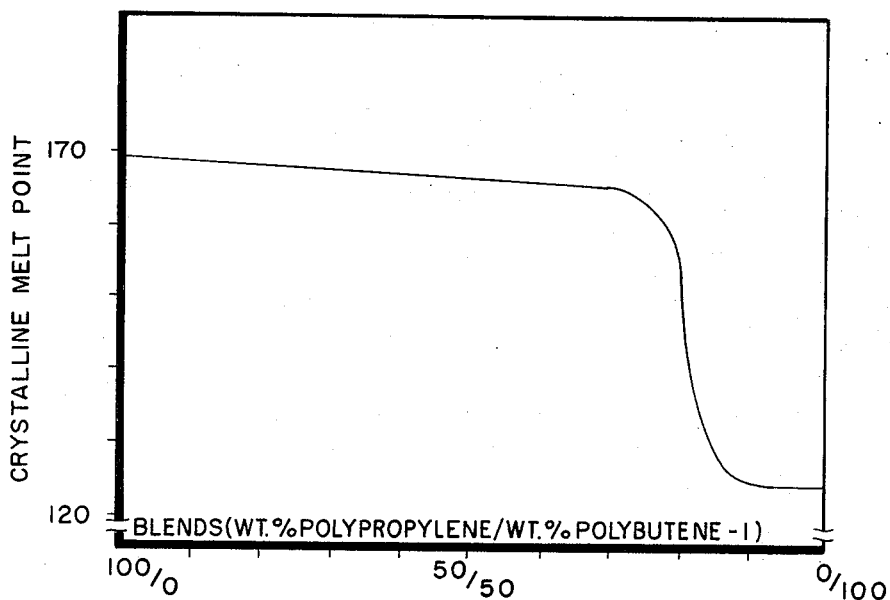

It will be seen from FIG. 2 that as polybutene-1 concentration was increased, the racking temperature range was greatly expanded. When a blend containing at least 70% polybutene-1 is oriented the racking range is surprisingly extended greatly until 100% polybutene-1 where the maximum racking temperature abruptly drops to 190° F. It is obvious from FIG. 4 that these sealing temperatures are unexpected from the crystalline melt point determinations of the blends which give no evidence of a eutectic point. These melt points were made by observing the loss of birefringance patterns produced by polarized light within the polymer sample as the sample was heated. Complete loss of the birefringance pattern was interpreted to be the crystalline melting point of the polymer.

EXAMPLE II

Seal strength of blends of polypropylene and polybutene-1

The seal strength of the heat seals of films oriented as described in Example I and sealed at 160° F. to 280° F. was measured at room temperature. The seal strength was determined on films obtained from hats of approximately equal volume (800 cc.) so that the degree of racking was constant for all determinations. The films (.5 mil) were sealed to each other with a bar type sealer adjusted to the desired temperature (160° F.–280° F.). The bar pressure was 20 p.s.i. and the time of sealing was held constant at 2 seconds.

Seal strength was determined with a constant rate of loading on a tensile tester. The linear dimensions of the sealed surface were held constant at 1 inch. One piece of the sample was held in one clamp while the other piece was held in the other. As the rate of loading was increased, the net effect was to peel the seal apart. The force required to do this was measured in grams and the strength of the seal was reported as the grams force/linear inch of seal required to completely peel the seal apart.

The relative seal strength of each blend is depicted in FIG. 1. Surprisingly, the film blends heat seal to each other even at seal temperatures less than the melting point of the lowest melting polymer, viz. polybutene-1, which melts at about 251° F. Although seal strength increases with temperature, there was considerable strength in the 40/60 blends even at temperatures as low as 160° F. The breadth, as well as the strength, of the blend ratios which seal increased at 180° F. At 200° F. seal strength greatly increased. No attempt was made to determine seal strength of the blends at a temperature above the melting point of the blends since complete fusion would result and the seal strength would approach the strength of the unoriented film.

The seal strength of non-oriented blends of polypropylene/polybutene-1 was determined by reextruding the aforementioned blends and chill casting the extrudate. Seal strength was determined as hereinbefore described and plotted in FIG. 1. It is to be noted that again the seal strength was sufficient to be of practical value even at temperatures as low as 160° F. even though non-oriented polymer does not have the strength of oriented polymer.

A major advantage of the ability of the blend to heat seal at temperatures less than the melting point of either polymer is that there is less effect on the alignment of the molecules so that the inherent strength of the oriented film can be utilized.

Since neither polypropylene nor polybutene-1 seals below 220° F., one would expect that the blends also would not seal at these temperatures. However, as can be seen in FIG. 1, most blends could be satisfactorily sealed below this temperature. The strength of the seals increased with the increase of polybutene-1 concentration up to about 60% polybutene-1. At concentrations greater than about 60% polybutene-1 the seal strength diminished sharply. The low temperature heat sealability of the blends is thus seen to be a peculiar characteristic of the blends and not simply a proportional additive effect of the polybutene-1.

EXAMPLE III

Free shrinkage of blends of polypropylene and polybutene-1

Figure 3:
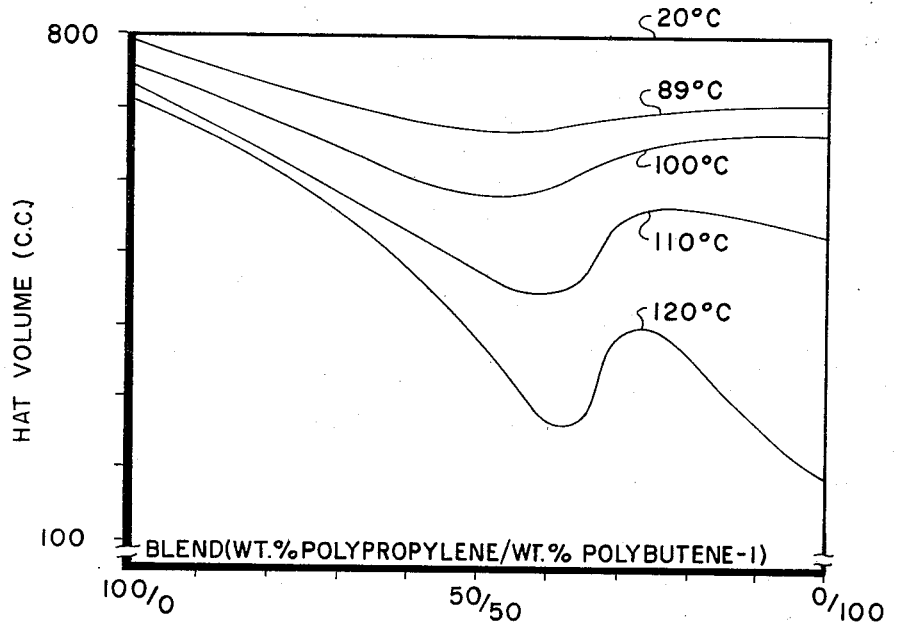

Using the same "hat" samples oriented in Example I one hour after extrusion, the free shrinkage was obtained by subjecting each of the samples to gradually increasing temperatures and measuring the loss of original volume at the reference temperature (70° F.). Each sample was coated with oil to avoid heat sealing and was maintained at the testing temperature for five minutes. Shrink temperature was then plotted vs. hat volume (cc.) (not shown). Since all of the heat seal data were obtained from hats oriented to 800 cc. volume, interpolated shrink values were obtained from the above (not shown) plot for each blend and plotted in FIG. 3. The constant temperature lines in FIG. 3 reveal a higher tendency for shrinkage as the amounts of polybutene-1 were increased up to about the 40/60 blend. Surprisingly, as the concentration of polybutene-1 increased above 60%, the degree of film shrinkage at any one temperature sharply decreased and then either remained constant or increased again depending on the shrink temperature. Thus, it will be seen that considerable shrinkage (about 25% at 212° F. for the 40/60 blend) is obtained at temperatures considerably less than those normally employed for heat shrinking of either of the parent polymers. Thus, boiling water, for example, could be used.

EXAMPLE IV

Overlap seal with oriented blends of polypropylene and polybutene-1

Using the same polymers as in Example I, 300 pounds of a blend of 80% isotactic polypropylene and 20% isotactic polybutene-1 were mixed in pellet form. A 2½-inch extruder equipped with a six inch tubular die was started using 100% polypropylene. The blend was then substituted and the die and barrel temperatures maintained at 350° F. Both clarity and thickness remained constant throughout the entire five-hour run.

The following day two rolls of 6 inch tubing were racked at various tape speeds of 8 to 12 feet per minute at about 300° F. by inflating the tape with air to form a bubble between two sets of pinch rolls. The longitudinal racking ratio was about 7.0 and the transverse racking ratio varied from 4.9 (31½ inch film) to 5.9 (38 inch film) depending on the amount of air. The bubble was then deflated and the tape slit to form a .75 mil film.

Samples of the film were then run on automatic breadwrap equipment. Effective overlap seals were made over a wide range of temperatures, 220–270° F., with the best seal being made at 240° F. No end labels were required. No difficulty in sealing was encountered even though many layers of film.

EXAMPLE V

Two hundred pounds of polybutene-1 (isotactic content—97.5%) were mixed with 180 pounds of polypropylene (Profax 6420) to produce a 40/60 blend. This was extruded onto a 6 inch tape at 350° F., quenched with water and biaxially oriented at 180° F. by inflating into a .75 mil film in a 2 day run using a 2½ inch oven extruder. Rapid quenching (2⅝ inches from die) produced an extremely clear film exhibiting up to 40% shrink at 205° F. By lowering the cooling ring 2 feet below the die the resulting tapes were crystalline enough to withstand a 200° F. racking temperature without welding and yet yielding clear films. Film was successfully oriented from 180° F. to 230° F. but optimum conditions existed where the tape was oriented at 210° F.

EXAMPLE VI

The effect of quenching on seal strength of a 40/60 blend of polypropylene/polybutene-1 was determined on 0.75 mil films. Strengths of the seal made at 220° F. was hereinbefore described were measured at 70° F. The results are summarized in Table 1.

TABLE I

| Degree of quenching [1]: | Seal strength gms./linear inch |
| --- | --- |
| Rapid | 144 |
| Medium | 78 |
| Slow | 52 |

[1] Rapid quench refers to a water quench 2⅝″ below the die. Medium quench refers to a water quench 2 feet below the die. Slow quench refers to a water quench 6 feet below the die.

Since a rapid quench should produce a polymer which is more amorphous than one which has been slowly quenched, it is apparent that the heat seals of the more amorphous tapes had higher strength than the films produced from more crystalline tapes.

Another advantage of the blend of the invention is that film made therefrom may be simultaneously heat sealed and heat shrunk at convenient temperatures such as the boiling point of water. For example, an object to be enclosed is wrapped in a film of the blend, the film edges overlapped, and the wrapped object submerged in boiling water thereby not only shrinking the film tightly around the object but also sealing the film together at the points of contact.

While certain examples, structures, composition and process steps have been described for purposes of illustration, the invention is not limited to these. Variation and

I claim:

1. A process for heat sealing and heat shrinking isotactic polyproylene comprising blending 30/90 weight parts of isotactic polypropylene with 10–70 weight parts of polybutene-1 to form a homogeneous blend, forming a film by extruding said blend, water quenching said film at not more than 2 feet from the extrusion die, biaxially orienting said film at a temperature between 180° F.–230° F., juxtapositioning a portion of said film with a surface, applying heat to said film at a temperature below the melting point of said polypropylene and below the melting point of said polybutene-1 and between 160 to 250° F. to seal said film and applying heat between 180 to 290° F. to shrink said film.

2. The process of claim 1 wherein said film is water quenched at not more than 2⅝ inches from the extrusion die.

3. The process of claim 1 wherein said orientation is carried out at about 210° F.

4. A process for producing an isotactic polypropylene material having superior heat sealing and heat shrinking characteristics comprising blending 30–90 weight parts of isotactic polypropylene with 10–70 weight parts of polybutene-1 to form a homogeneous blend, forming a film by extruding said blend, orienting said film at a temperature between 180° F. and 230° F.

5. The process of claim 4 wherein said blend is 30–50 weight parts of isotactic polypropylene and 70–50 weight parts of isotactic polybutene-1 and wherein said extruded film is water quenched at not more than 2 feet from the extrusion die and orientation is carried out biaxially at about 210° F.

6. A process for heat sealing isotactic polypropylene comprising blending 30–90 weight parts of isotactic polypropylene with 10–70 weight parts of polybutene-1 to form a homogeneous blend, forming a film from said blend, biaxially orienting said film, juxtapositioning a portion of said film with a surface, and submerging said film in boiling water to simultaneously heat seal and heat shrink same, said water temperature being about 212° F.

7. A process for heat sealing isotactic polypropylene comprising: blending 30 to 50 weight parts of isotactic polypropylene which is at least 93% insoluble in boiling normal heptane with from 70 to 50 weight parts of isotactic polybutene-1 which is at least 93% insoluble in boiling diethylether to form a homogeneous blend; forming a film from said blend; biaxially orienting said film; juxtapositioning a portion of said film with a surface; heat sealing the film at a temperature in the range of 160° F. to 210° F.; and, heat shrinking the film at least 25% at a temperature in the range of 190° F. to 230° F.

8. The process of claim 6 wherein an object is at least partially enclosed in said film, portions of said film are overlapped, and said film is thereafter placed in boiling water and simultaneously heat sealed and heat shrunk.

References Cited

UNITED STATES PATENTS

| | | | |
|---|---|---|---|
| 3,372,049 | 3/1968 | Schaffausen | 117—7 |
| 3,246,061 | 4/1966 | Blatz | 264—95 |
| 3,014,234 | 12/1961 | Koppehele | 18—1 |
| 3,022,543 | 2/1962 | Baird et al. | 18—57 |

FOREIGN PATENTS

| | | | |
|---|---|---|---|
| 809,484 | 2/1959 | Great Britain | 260—897 |

MURRAY TILLMAN, Primary Examiner

C. J. SECCURO, Assistant Examiner

U.S. Cl. X.R.

260—897 A; 264—230, 342, 288